(12) United States Patent
Okuda

(10) Patent No.: US 9,307,126 B2
(45) Date of Patent: Apr. 5, 2016

(54) IMAGING APPARATUS HAVING BENDING OPTICAL ELEMENT

(71) Applicant: HOYA CORPORATION, Tokyo (JP)

(72) Inventor: Isao Okuda, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/546,249

(22) Filed: Nov. 18, 2014

(65) Prior Publication Data

US 2015/0146087 A1 May 28, 2015

(30) Foreign Application Priority Data

Nov. 28, 2013 (JP) ................................ 2013-246374

(51) Int. Cl.
*H04N 5/225* (2006.01)
*G02B 13/00* (2006.01)

(52) U.S. Cl.
CPC ............ *H04N 5/2252* (2013.01); *G02B 13/009* (2013.01); *H04N 5/2254* (2013.01)

(58) Field of Classification Search
CPC .............. H04N 5/2252; H04N 5/2254; H04N 5/23264; H04N 5/2328; H04N 5/23287; G02B 13/009
See application file for complete search history.

(56) References Cited

U.S. PATENT DOCUMENTS

| | | | |
|---|---|---|---|
| 6,342,922 B1 * | 1/2002 | Mizoguchi | H04N 5/23212 348/342 |
| 6,362,921 B1 * | 3/2002 | Iida | G02B 7/02 348/E5.025 |
| 7,663,694 B2 * | 2/2010 | Kurosawa | G03B 5/08 257/433 |
| 8,849,107 B2 | 9/2014 | Nomura et al. | |
| 2007/0086766 A1 * | 4/2007 | Nomura | G03B 13/18 396/89 |
| 2008/0297921 A1 * | 12/2008 | Kodaira | G01C 1/02 359/822 |
| 2012/0075518 A1 | 3/2012 | Okuda | |
| 2013/0026344 A1 | 1/2013 | Okuda | |
| 2013/0155317 A1 * | 6/2013 | Uenaka | G03B 17/02 348/374 |

(Continued)

FOREIGN PATENT DOCUMENTS

| | | |
|---|---|---|
| JP | 2006-267391 | 10/2006 |
| JP | 2006-293187 | 10/2006 |

(Continued)

OTHER PUBLICATIONS

U.S. Appl. No. 14/559,028 to Isao Okuda, which was filed Dec. 3, 2014.
U.S. Appl. No. 14/501,816 to Hiroshi Nomura et al., which was filed Sep. 30, 2014.

*Primary Examiner* — Timothy J Henn
(74) *Attorney, Agent, or Firm* — Greenblum & Bernstein, P.L.C.

(57) ABSTRACT

An imaging apparatus includes an imaging optical system, a bending optical element and an image sensor; an inclination adjusting plate which mounts the image sensor onto a housing with a pair of opposed sides of the image sensor extending in a direction orthogonal to a pre-bending optical axis, of the imaging optical system; a pair of end portions formed on the inclination adjusting plate and positioned outside the pair of opposed sides of the image sensor; a swing fulcrum formed between an inner end portion, which is closest to the pre-bending optical axis, and the housing; and an inclination adjuster provided between an outer end portion, which is farthest from the pre-bending optical axis out, and the housing, to make the inclination adjustment plate swing about the swing fulcrum to adjust the inclination adjustment plate.

7 Claims, 6 Drawing Sheets

(56) References Cited

U.S. PATENT DOCUMENTS

2014/0218798 A1 8/2014 Suzuka
2014/0218799 A1 8/2014 Suzuka
2015/0295004 A1* 10/2015 Yen .................. H01L 27/14625
250/208.1

FOREIGN PATENT DOCUMENTS

| | | |
|---|---|---|
| JP | 2010-243763 | 10/2010 |
| JP | 2013-105049 | 5/2013 |

* cited by examiner

IMAGING APPARATUS HAVING BENDING OPTICAL ELEMENT

BACKGROUND OF THE INVENTION

1. Field of the Invention

The present invention relates to an imaging apparatus having at least one bending optical element, and in particular relates to such an imaging apparatus which is small in size and equipped with an inclination adjusting mechanism for adjusting the inclination of an image sensor.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and tablet computers, etc., equipped with a camera, have become widespread, and there has been a demand to miniaturize the imaging units incorporated in these types of mobile electronic devices. In order to miniaturize an imaging unit, it is known to configure an optical system of an imaging unit as a bending optical system which reflects (bends) a light bundle using a reflection surface of a reflecting element (bending optical element) such as a prism or a mirror. An imaging optical system having at least one bending optical element (hereinafter also referred to as the "imaging apparatus") is advantageous in achieving a reduction in thickness of the imaging unit, especially in the travelling direction of the incident light emanating from an object to be photographed.

In such an imaging apparatus, an image sensor (image pickup device) is arranged on a post-bending optical axis (the optical axis after being optically bent by a bending optical element). Usually the image sensor is fixed to an image sensor board (image-sensor mounting board) that is provided as a separate member from the image sensor, and this image sensor board is fixed to a housing which supports an imaging optical system (which includes lens groups and at least one prism). An adjusting mechanism for adjusting the inclination of such an image sensor relative to a plane orthogonal to an optical axis is known in the art and disclosed in, e.g., Japanese Unexamined Patent Publication No. 2006-293187. However, this adjusting mechanism is unsuitable for achieving a reduction in thickness (slimming down) of the imaging unit.

Further examples of the related art are also disclosed in Japanese Unexamined Patent Publication Nos. 2006-267391, 2010-243763, and 2013-105049.

SUMMARY OF THE INVENTION

The present invention provides an imaging apparatus, wherein the inclination of an image sensor which lies on a post-bending optical axis (the optical axis after being optically bent by a bending optical element that is positioned adjacent to the image sensor) relative to a plane orthogonal to the post-bending optical axis is adjustable. In addition, the present invention provides an imaging apparatus, in which the thickness and the width of an imaging optical system thereof, in particular, can be kept small even though the imaging apparatus is equipped with an image sensor inclination adjusting mechanism, wherein a left-right length is defined as the dimensions of an imaging optical system in an optical axis direction thereof (in a direction of a pre-bending optical axis), the thickness is defined as the dimensions of the imaging optical system in a direction of a post-bending optical axis, and the width is defined by the dimensions of the imaging optical system in a direction orthogonal to both the left-right length and the thickness direction.

According to an aspect of the present invention, an imaging apparatus is provided, including an imaging optical system including at least one lens group, at least one bending optical element which bends a light bundle emanating from an object, and an image sensor having a rectangular shape, in a plan view thereof, which lies on a post-bending optical axis of the imaging optical system, the post-bending optical axis being optically bent by the bending optical element; a housing which supports the imaging optical system; an inclination adjusting plate which mounts the image sensor onto the housing with a pair of sides of the image sensor that are opposed to each other extending in a direction orthogonal to a pre-bending optical axis, of the imaging optical system, before being optically bent by the bending optical element; a pair of end portions formed on the inclination adjusting plate and positioned outside the pair of opposed sides of the image sensor, respectively; a swing fulcrum formed between an inner end portion, which is closest to the pre-bending optical axis out of the pair of end portions, and the housing; and an inclination adjuster which is provided between an outer end portion, which is farthest from the pre-bending optical axis out of the pair of end portion, and the housing, to make the inclination adjustment plate swing about the swing fulcrum to adjust an inclination of the inclination adjustment plate.

It is desirable for the inclination adjuster to include a biaser provided between the housing and the outer end portion of the inclination adjusting plate to bias the outer end portion in a direction away from the housing; and a pair of adjustment screws provided spaced from each other in a lengthwise direction of the outer side end portion to engage the outer end portion with the housing. The pair of adjustment screws pass through holes formed in the housing to extend toward the inclination adjusting plate side. Ends of threaded portions of the pair of adjustment screws are screw-engaged with the outer end portion.

It is desirable for the inclination adjusting plate to include a mounting plate portion, onto which the image sensor is mounted, wherein the outer end portion of the inclination adjusting plate includes a proximate plate portion which is closer to the housing than the mounting plate portion, and the pair of adjustment screws are screw-engaged with the proximate plate portion.

It is desirable for the ends of the threaded portions of the pair of adjustment screws are positioned closer to the housing than the mounting plate portion of the inclination adjusting plate.

It is desirable for the swing fulcrum to include a fulcrum projection which is formed on the inclination adjusting plate substantially at a center of the inner end portion with respect to a lengthwise direction thereof, the fulcrum projection projecting in a direction away from the bending optical element; and a contact portion formed on the housing to contact the fulcrum projection.

It is desirable for the biaser to include a pair of compression coil springs which are arranged to correspond to the pair of adjustment screws.

It is desirable for the bending optical element to be provided between the image sensor and a lens group, of the imaging optical system, that is provided closest to the image side.

According to the present invention, an imaging apparatus can be obtained which is equipped with an inclination adjusting mechanism for adjusting the inclination of an image sensor and is small, especially in thickness and width directions.

The present disclosure relates to subject matter contained in Japanese Patent Application No. 2013-246374 (filed on Nov. 28, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

An embodiment of an imaging unit (imaging apparatus having at least one bending optical element) 10 according to the present invention will be discussed below with reference to FIGS. 1 through 6. In the following descriptions, forward and rearward directions, leftward and rightward directions, and upward and downward directions are determined with reference to the directions of the double-headed arrows shown in FIGS. 1 through 6. The object side corresponds to the front side. The thickness direction and the widthwise direction of the imaging unit 10 correspond to the forward/rearward direction and the upward/downward direction, respectively. As shown by the outward appearance of the imaging unit 10 in FIG. 1, the imaging unit 10 has a laterally elongated shape which is slim in the forward/rearward direction (in the thickness direction) and long in the leftward/rightward direction.

Figure 2:
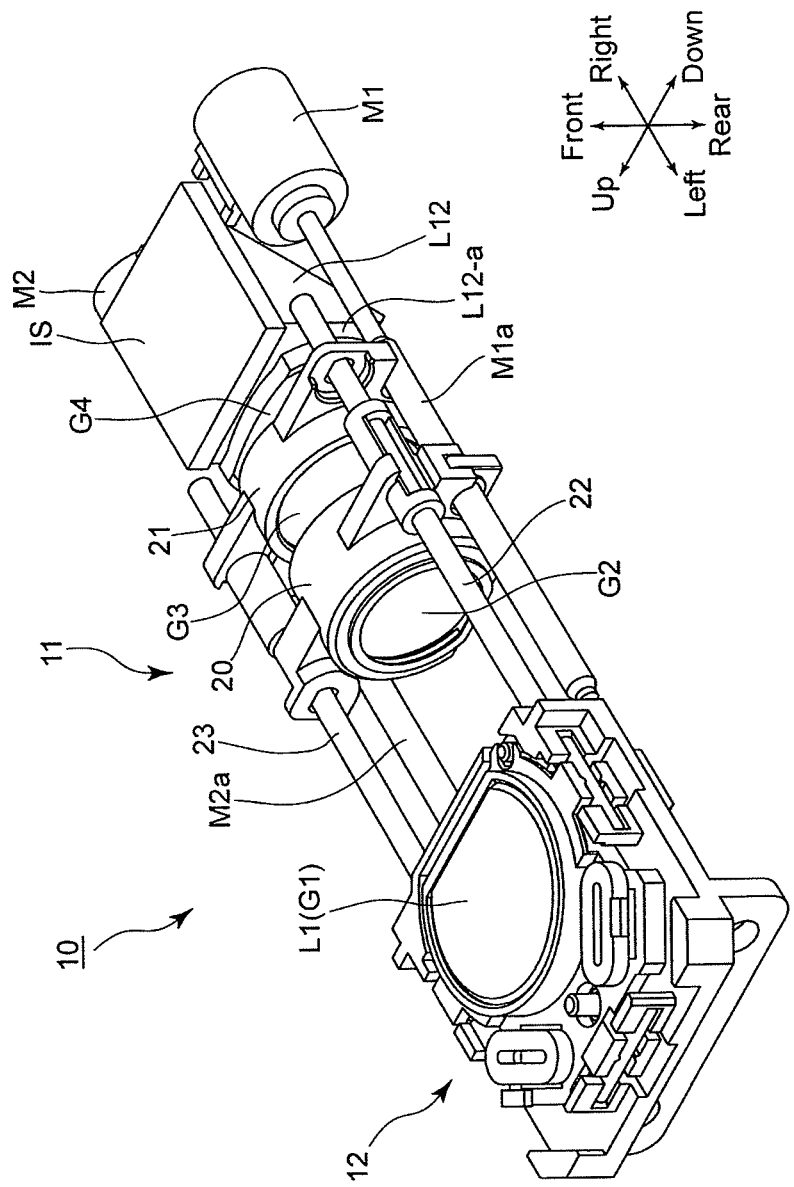
FIG. 2 is a perspective view of the imaging apparatus, showing an internal structure thereof.
Figure 3:
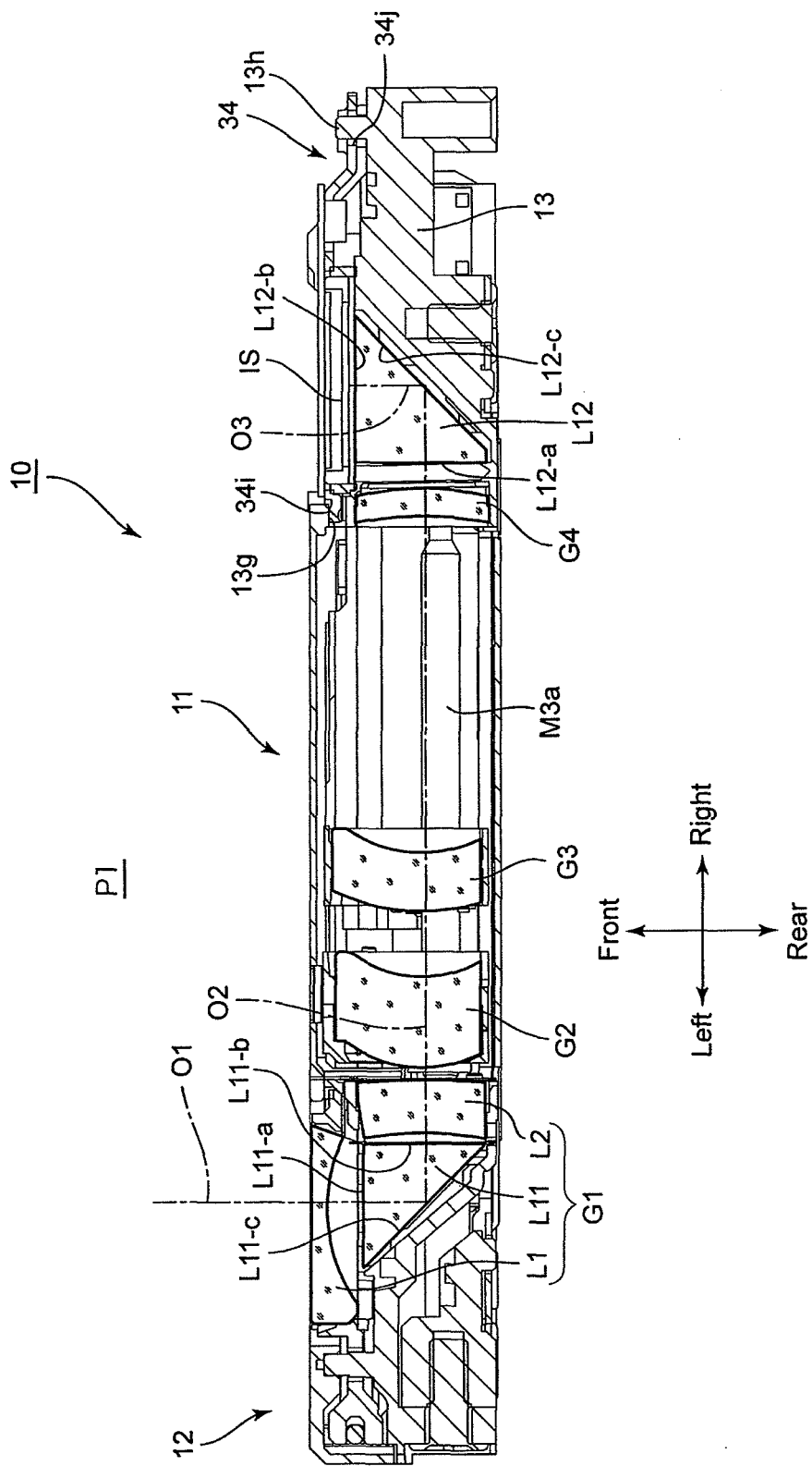
FIG. 3 is a sectional view taken along the line III-III shown in FIG. 1.

As shown in FIGS. 2 and 3, the imaging unit 10 has an imaging optical system which is provided with a first lens group G1, a second lens group (rear lens group) G2, a third lens group (rear lens group) G3 and a fourth lens group (rear lens group) G4. The first lens group G1 is provided with a first prism (bending optical element) L11, and the imaging unit 10 is provided with a second prism (bending optical element) L12 on the right-hand side of the fourth lens group G4. The imaging optical system of the imaging unit 10 is configured as a bending optical system which reflects (bends) a light bundle at substantially right angles at each of the first prism L11 and the second prism L12. As shown in FIG. 3, the first lens group G1 is configured of a first lens element L1, the first prism L11 and a second lens element L2. The first lens element L1 is positioned in front of (on the object side of) an incident surface L11-a of the first prism L11, while the second lens element L2 is positioned on the right-hand side of an exit surface L11-b of the first prism L11. Each of the second lens group G2, the third lens group G3 and the fourth lens group G4 is a lens group which does not include a reflector element such as a prism.

As shown in FIG. 3, a light bundle emanating from the photographic object and incident on the first lens element L1 along a first optical axis O1, which extends in the rearward direction from the front of the imaging unit 10, enters the first prism L11 through the incident surface L11-a and is reflected by a reflecting surface L11-c of the first prism L11 in a direction along a second optical axis (pre-bending optical axis) O2 (extending in the rightward direction) to exit from the exit surface L11-b of the first prism L11. Subsequently, the light bundle exiting from the exit surface L11-b passes through the second lens element L2 of the first lens group G1 and the second through fourth lens groups G2, G3 and G4 (the second through fourth lens groups G2, G3 and G4), which lie on the second optical axis O2, and is incident on the second prism L12 through an incident surface L12-a thereof. Subsequently, the light bundle which is passed through the incident surface L12-a is reflected by a reflection surface L12-c of the second prism L12 in a direction along a third optical axis (post-bending optical axis) O3 (extending in the forward direction) and is incident on the imaging surface of an image sensor IS to form an object image thereon. The first optical axis O1 and the third optical axis O3 are substantially parallel to each other and lie, together with the second optical axis O2, on a common plane P1. The imaging unit 10 has a shape elongated in a direction along the second optical axis O2, and the first lens element L1 is positioned in the vicinity of an end (the left end) of the imaging unit 10 with respect to the lengthwise direction thereof. The second optical axis O2 constitutes an optical axis (pre-bending optical axis) of the imaging optical system, and the third optical axis O3 constitutes a post-bending optical axis of the imaging optical system of the imaging optical system.

Figure 1:
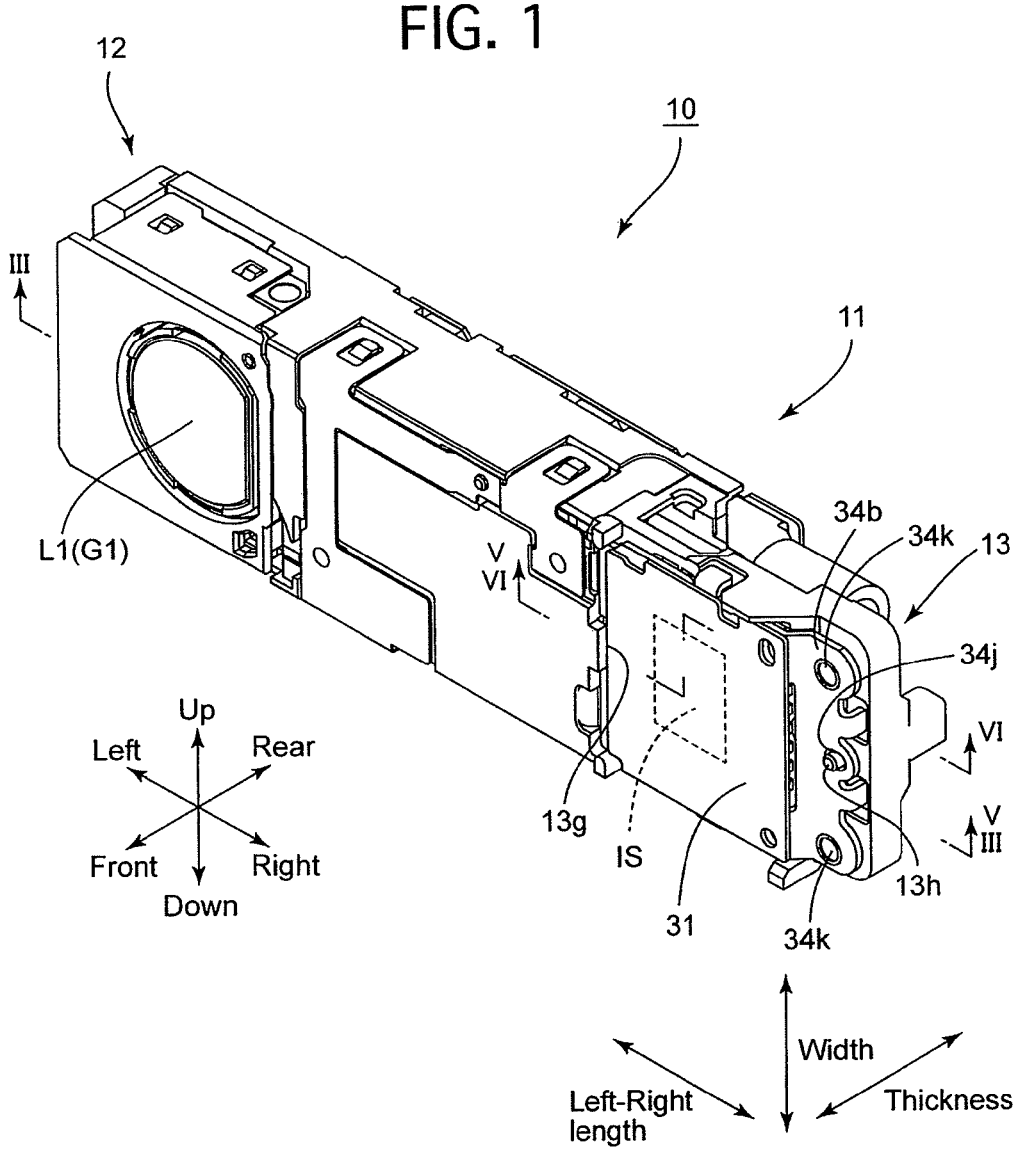
FIG. 1 is an external perspective view of an embodiment of an imaging apparatus according to the present invention.

As shown in FIGS. 1 through 3, the imaging unit 10 is provided with a body module 11 which holds the second lens group G2, the third lens group G3, the fourth lens group G4, the second prism L12 and the imaging sensor IS, and a first lens-group unit 12 which holds the first lens group G1. The body module 11 is provided with a box-shaped housing 13 which is elongated in the leftward/rightward direction and is small in thickness (slim) in the forward/rearward direction. The first lens-group unit 12 is fixed to one end (the left end) of the housing 13, with respect to the lengthwise direction thereof, and the fourth lens group G4, the second prism L12 and the imaging sensor IS are fixedly held at the other end (the right end) of the housing 13, with respect to the lengthwise direction thereof. However, the configuration of the imaging unit 10 is not limited to the embodiment shown in FIGS. 1 through 3; for example, the body module 11 and the first lens-group unit 12 can alternatively be formed as a single unitary member.

As shown in FIG. 2, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 and a second motor M2 which are supported by the housing 13. When the first motor M1 is driven to rotate a screw shaft M1a thereof which projects from the body of the first motor M1, this rotation is transmitted to the second lens group frame 20 to move the second lens group frame 20 along the pair of rods 22 and 23. When the second motor M2 is driven to rotate a screw shaft M2a thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an anti-shake (image shake correction/image-stabilizing/shake reduction) system that reduces image shake on an image plane which is caused by vibrations such as hand shake. This anti-shake system drives the first lens element L1 of the first lens group G1 in a plane orthogonal to the first optical axis O1. This anti-shake system itself is unrelated to the gist of the present invention, and therefore, the description thereof is omitted from the following descriptions.

Figure 4:
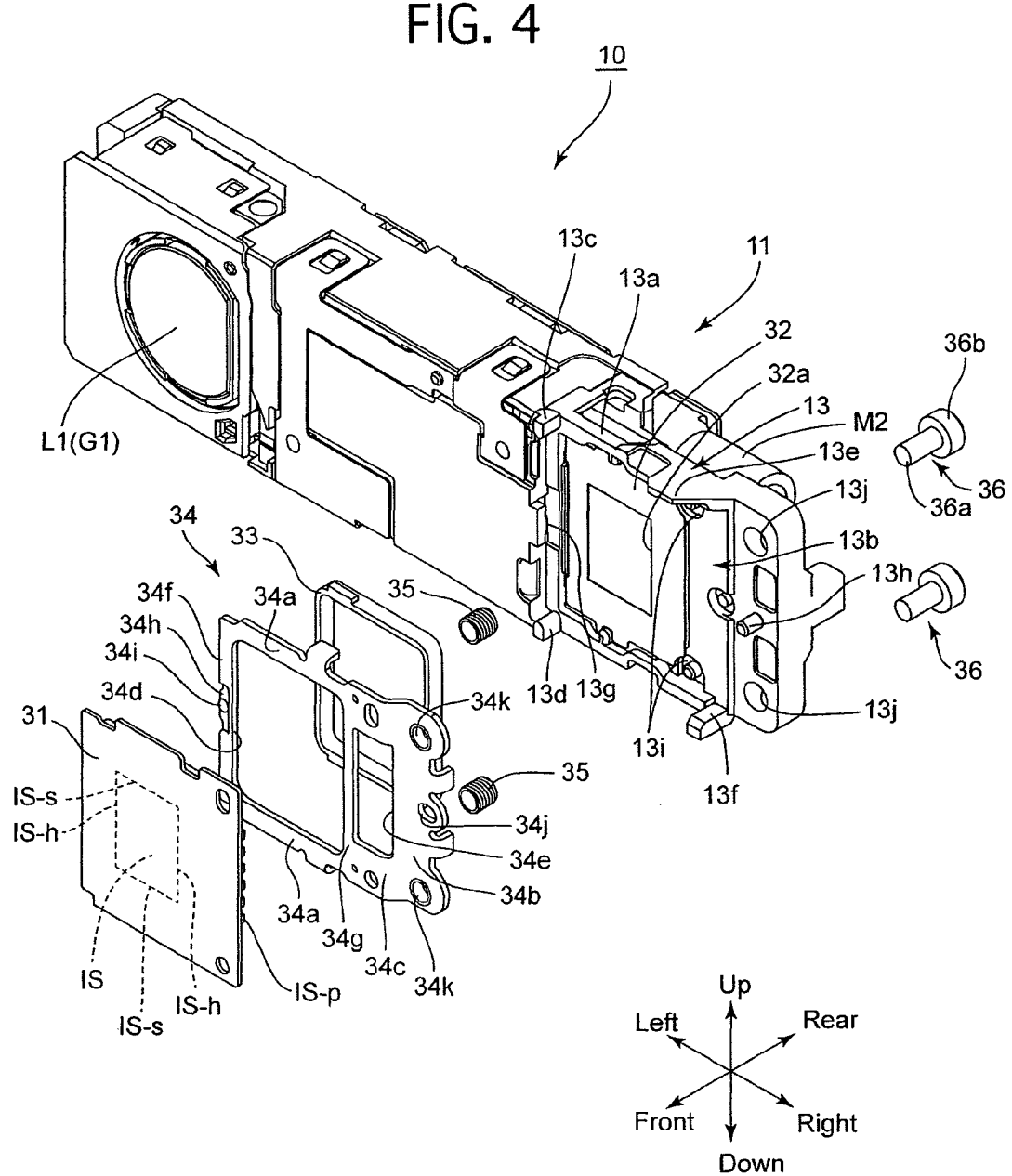
FIG. 4 is an exploded perspective view of the imaging apparatus, showing an image sensor inclination adjusting mechanism incorporated therein in an exploded state.
Figure 5:
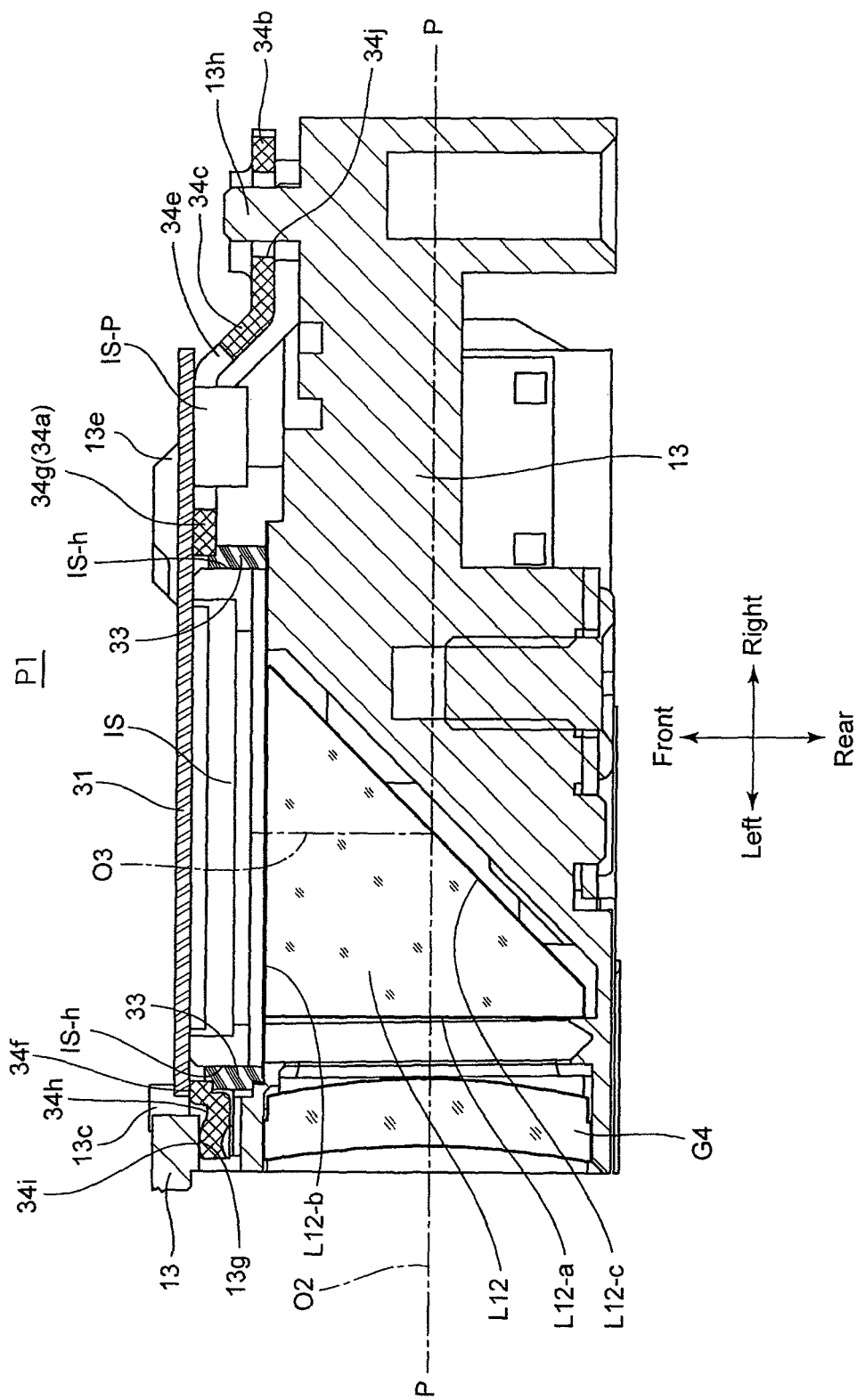
FIG. 5 is an enlarged sectional view taken along the line V-V shown in FIG. 1.
Figure 6:
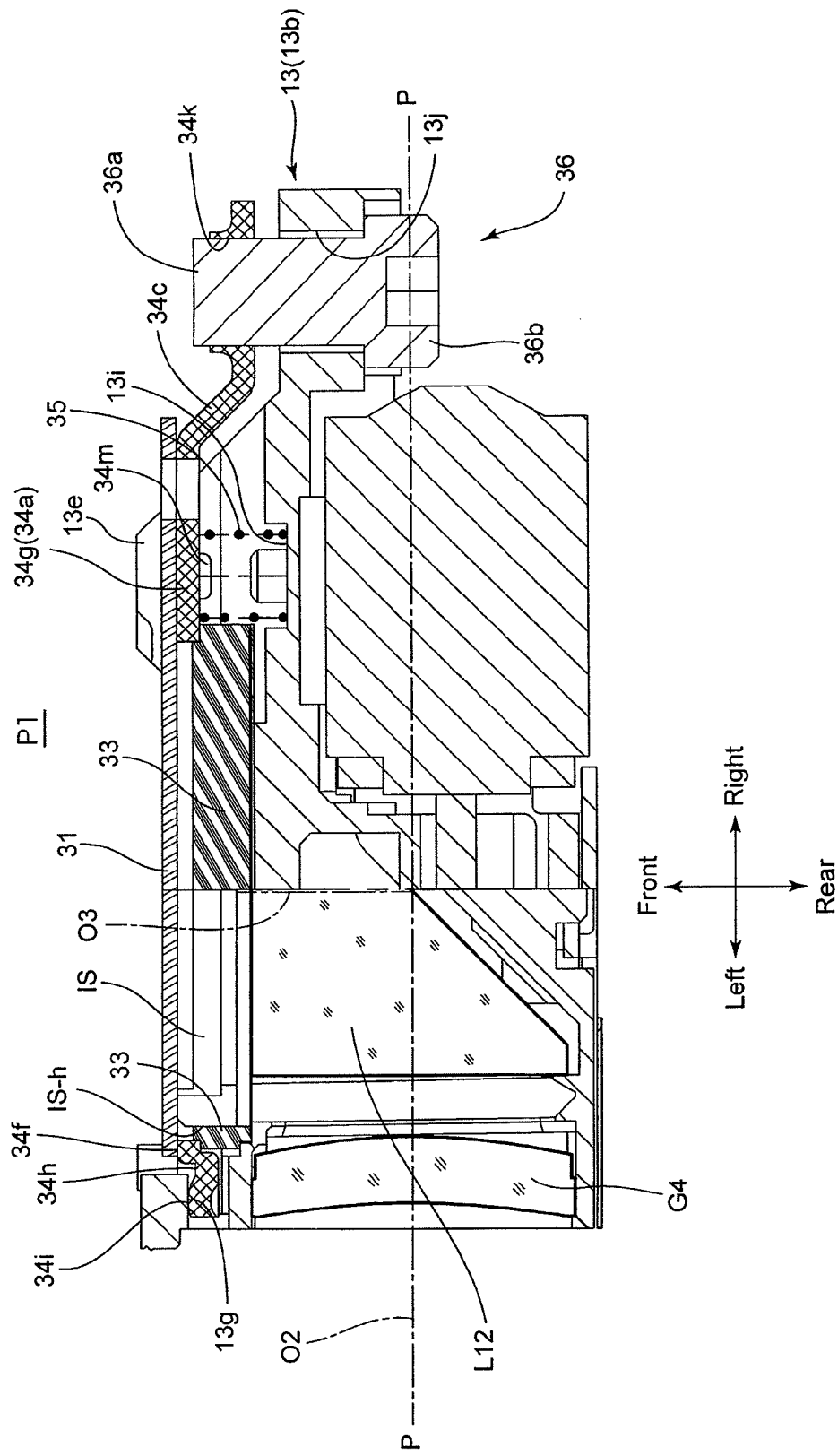
FIG. 6 is an enlarged sectional view taken along the VI-VI shown in FIG. 1.

FIGS. 4 through 6 show an embodiment of an inclination adjusting mechanism for adjusting the inclination of the image sensor IS that is positioned on the third optical axis O3, which is bent by the reflecting surface L12-c of the second prism L12 of the above described imaging apparatus. In the illustrated embodiment, the image sensor IS is rectangular in a plan view, including a pair of long sides IS-h and a pair of short sides IS-s, and the pair of long sides IS-h face each other in the leftward/rightward direction while the pair of short sides IS-s face each other in the upward/downward direction as shown in FIG. 4. The image sensor IS is fixed to a sensor board (image-sensor mounting board) 31. The pair of long sides IS-h are orthogonal to the second optical axis O2 in a plan view from the front (are each located at a right angle relative to the second optical axis O2 without intersecting the second optical axis O2). A light shielding member 32 is fixed to the housing 13 to lie on the exit surface L12-b of the second prism L12. The light shielding member 32 is provided at a center thereof with a rectangular aperture 32a which allows a light bundle emanating from a photographic object to pass therethrough. A packing 33 and an inclination adjusting plate 34 are provided between the sensor board 31 and the light shielding member 32. The packing 33 is made of a resilient material which is formed into a rectangular shape to correspond to the outside shape of the image sensor IS.

The inclination adjusting plate 34 is provided with a mounting plate portion 34a, a proximate plate portion 34b and a curved plate portion 34c. The mounting plate portion 34a is for mounting the image sensor IS. The proximate plate portion 34b is parallel to the mounting plate portion 34a and is closer to the housing 13 (closer to an imaginary plane P (see FIGS. 5 and 6) which is orthogonal to a plane including both the second optical axis O2 and the third optical axis O3 and includes the second optical axis O2) than the mounting plate portion 34a. The curved plate portion 34c connects the mounting plate portion 34a and the proximate plate portion 34b. The inclination adjusting plate 34 and the sensor board 31 are bonded to each other. The mounting plate portion 34a is provided with a rectangular opening 34d, through which the image sensor IS is exposed, and the inclination adjusting plate 34 is further provided with an opening 34e which is formed extending over the mounting plate portion 34a and the curved plate portion 34c to expose electronic parts IS-p, which are contained on the sensor board 31, through the opening 34e. A portion of the inclination adjusting plate 34 on the left-hand side of the rectangular opening 34d (on the side of the rectangular opening 34d that is closest to the pre-bending optical axis (the second optical axis O2) (and also closest to the first optical axis O1)) constitutes an inner end portion 34f, and another portion of the inclination adjusting plate 34 on the right-hand side of the rectangular opening 34d (on the side of the rectangular opening 34d that is farthest from the pre-bending optical axis (the second optical axis O2) (and also farthest from the first optical axis O1)) constitutes an outer end portion 34g which includes the proximate plate portion 34b and the curved plate portion 34c.

The housing 13 is provided with a support portion 13a for the second prism L12 and is provided, on the outer side (right-hand side) of the support portion 13a in the rightward direction, with an inclination adjusting portion 13b. The housing 13 is provided on the support portion 13a and the inclination adjusting portion 13b with front projections 13c, 13d; 13e and 13f to correspond to the outer shape of the inclination adjusting plate 34 (specifically the outer shapes of the mounting plate portion 34a, the inner end portion 34f and the outer end portion 34g) to define the planar position of the inclination adjusting plate 34 on the housing 13.

The inclination adjusting plate 34 is provided, at the center of the inner end portion 34f in the lengthwise direction thereof, with a recessed portion 34h which is recessed one step toward the housing 13 (toward the inclination adjusting portion 13b). In addition, the inclination adjusting plate 34 is further provided, at the center of the recessed portion 34h on the sensor board 31 side (on the opposite side of the inclination adjusting plate 34 from the housing 13), with a fulcrum projection (swing fulcrum) 34i which projects in a direction away from the second prism L12 (away from the second optical axis O2 (the imaginary plane P)). The housing 13 is provided with a contact portion 13g which projects toward the support portion 13a and comes in contact with the fulcrum projection 34i. The fulcrum projection 34i comes in contact with the contact portion 13g from the second optical axis O2 side (from the imaginary plane P side). The inclination adjusting plate 34 can swing in directions to move the outer end portion 34g (the proximate plate portion 34b) toward and away from the housing 13 due to the contact engagement between the fulcrum projection 34i and the contact portion 13g. An elongated hole 34j, which is elongated in a direction parallel to the second optical axis O2 and in which a guide pin 13h projecting from the housing 13 is slidably engaged, is formed in the proximate plate portion 34b of the inclination adjusting plate 34 at a central position in the proximate plate portion 34b with respect to the lengthwise direction of the outer end portion 34g. The elongated hole 34j allows the inclination adjusting plate 34 to move only in the swinging direction about the point of contact between the fulcrum projection 34i and the contact portion 13g.

On the other hand, a pair of compression coil springs (biaser/inclination adjuster) 35, which are mutually identical in specification and bias the proximate plate portion 34b in a direction away from the housing 13 (the inclination adjusting portion 13b), are installed on the mounting plate portion 34a (the outer end portion 34g). The pair of compression coil springs 35 are spaced from each other in the lengthwise direction of the outer end portion 34g (i.e., the upward/downward direction), and are inserted in between a pair of spring housing recesses 13i formed in the housing 13 and a pair of spring-center protrusions 34m formed on the mounting plate portion 34a, respectively.

A pair of adjustment screws (inclination adjuster) 36 for lock-engaging the inclination adjusting plate 34 to the housing 13 against the biasing force of the pair of compression coil springs 35 are provided between the housing 13 and the inclination adjusting plate 34, by extending through the housing 13 and the inclination adjusting plate 34 to be screw-engaged with the inclination adjusting plate 34 as shown in FIG. 6. The pair of adjustment screws 36 are arranged to correspond to the pair of compression coil springs 35 at positions closer to the outer side (to a side (specifically the right-hand side) away from the rectangular opening 34d) than the pair of compression coil springs 35. A pair of screw-insertion through-holes 13j are formed in the housing 13, and a pair of female screw holes 34k, in which the pair of adjustment screws 36 are screw-engaged, are formed in the proximate plate portion 34b of the inclination adjusting plate 34. Each adjustment screw 36 is provided with a large-diameter head 36b, and the large-diameter heads 36b of the pair of adjustment screws 36 are engaged with the inclination adjusting portion 13b. The ends 36a (upper ends with respect to FIG. 6) of the threaded portions of the pair of adjustment screws 36 project toward the inclination adjusting plate 34 side from the inclination adjusting portion 13b side. In a state where the ends 36a of the threaded portions of the pair of adjustment screws 36 are screw-engaged with the pair of female screw holes 34k, respectively, the ends 36a of the threaded portions of the pair of adjustment screws 36 are positioned closer to the housing 13 (the imaginary plane P) than an extension plane extended from the sensor board 31 in the forward/rearward direction, i.e., at positions below this extension plane with respect to FIG. 6.

In the above described inclination adjusting apparatus for adjusting the inclination of the image sensor IS, the image sensor IS can be made to fall into a temporarily engaged state by positioning the inclination adjusting plate 34 to which (to the mounting plate portion 34a of which) the image sensor IS is mounted inside the front projections 13c, 13d, 13e and 13f, fitting the elongated hole 34j onto the guide pin 13h, inserting the pair of adjustment screws 36 into the pair of screw-insertion through-holes 13j from behind the inclination adjusting portion 13b, and screwing the ends 36a of the threaded portions of the pair of adjustment screws 36 into the pair of female screw holes 34k. In this temporarily engaged state, the inclination adjusting plate 34 can be made to tilt (swing) about the point of contact between the contact portion 13g and the fulcrum projection 34i, and the inclination of the image sensor IS relative to the third optical axis O3 can be adjusted by individually adjusting the amount of screwing of each adjustment screw 36 to the associated female screw holes 34k. The pair of compression coil springs 35 and the pair of adjustment screws 36 constitute an inclination adjuster.

The present embodiment of the inclination adjusting apparatus for the image sensor IS does not cause an increase in either width or thickness of the housing 13. Moreover, the ends 36a of the threaded portions of the pair of adjustment screws 36 do not project outside (beyond) the external periphery of the housing 13 in the thickness direction thereof because the proximate plate portion 34b of the inclination adjusting plate 34 is recessed one step rearward (so as to approach the imaginary plane P) in the thickness direction of the housing 13 from the position of the mounting plate portion 34a and because the pair of female screw holes 34k are formed in the proximate plate portion 34b thus recessed rearward.

Although the pair of long sides IS-h of the image sensor IS are orthogonal to the second optical axis O2 in a plan view from the front in the above described embodiment of the imaging apparatus, it is possible for the image sensor IS to be arranged so that the pair of short sides IS-s are orthogonal to the second optical axis O2 in a plan view from the front. In addition, the present invention can also be applied to an imaging apparatus using a square-shaped image sensor which corresponds to the image sensor IS (note that a rectangle includes a square).

Although the pair of compression coil springs 35 and the pair of adjustment screws 36 are installed at different positions in the above described embodiment of the imaging apparatus, it is possible for the pair of compression coil springs 35 to be fitted concentrically on the pair of adjustment screws 36, respectively.

Although the imaging optical system of the above-described imaging apparatus has the first prism L11, the present invention can also be applied to a imaging apparatus which does not include a prism that corresponds to the first prism L11. Additionally, although the second lens group G2, the third lens group G3 and the fourth lens group G4 are provided on the second optical axis O2, the present invention can also be applied to a type of imaging optical system in which less than or more than three lens groups are provided on an optical axis of the imaging optical system which corresponds to the second optical axis O2.

Additionally, in the first lens group G1, it is possible to change the number of lens elements arranged in front of the incident surface L11-a of the first prism L11 on the first optical axis O1 and the number of lens elements arranged on the right-hand side (the object image side) of the exit surface L11-b of the first prism L11 on the second optical axis O2.

Additionally, although the imaging optical system of the above illustrated embodiment of the imaging unit 10 is a zoom lens (variable power optical system) which performs a zooming operation (power varying operation) by moving the second lens group G2 and the third lens group G3 along the second optical axis O2, the present invention is also applicable to an imaging apparatus which incorporates an imaging optical system having no power varying capability. For instance, it is possible to modify the imaging unit 10 such that the second lens group G2 and the third lens group G3 do not move for a zooming operation and that the second lens group G2 or the third lens group G3 moves solely for a focusing operation.

Although the incident surface L11-a of the first prism L11 in the above illustrated embodiment of the imaging unit 10 is in the shape of a laterally elongated rectangle, the present invention can also be applied to a type of imaging apparatus (imaging optical system) having a first prism (which corresponds to the first prism L11), the incident surface thereof having a different shape such as a square or a trapezoid.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus comprising:
    an imaging optical system including at least one lens group, at least one bending optical element which bends a light bundle emanating from an object, and an image sensor having a rectangular shape, in a plan view thereof, which lies on a post-bending optical axis of said imaging optical system, said post-bending optical axis being optically bent by said bending optical element;
    a housing which supports said imaging optical system;
    an inclination adjusting plate which mounts said image sensor onto said housing with a pair of sides of said image sensor that are opposed to each other extending in a direction orthogonal to a pre-bending optical axis, of said imaging optical system, before being optically bent by said bending optical element;
    a pair of end portions formed on said inclination adjusting plate and positioned outside said pair of opposed sides of said image sensor, respectively;
    a swing fulcrum formed between an inner end portion, which is closest to said pre-bending optical axis out of said pair of end portions, and said housing; and
    an inclination adjuster comprising a pair of adjustment screws, which is provided between an outer end portion, which is farthest from said pre-bending optical axis out of said pair of end portion, and said housing, to make said inclination adjustment plate swing about said swing fulcrum to adjust an inclination of said inclination adjustment plate.

2. The imaging apparatus according to claim 1, wherein said inclination adjuster comprises:

a spring provided between said housing and said outer end portion of said inclination adjusting plate to bias said outer end portion in a direction away from said housing;

wherein the pair of adjustment screws are provided spaced from each other, in a direction orthogonal to a plane on which said pre-bending optical axis and said post-bending optical axis lie, to engage said outer end portion with said housing, and wherein said pair of adjustment screws pass through holes formed in said housing to extend toward said inclination adjusting plate side, and wherein ends of threaded portions of said pair of adjustment screws are screw-engaged with said outer end portion.

3. The imaging apparatus according to claim 2, wherein said inclination adjusting plate comprises a mounting plate portion, onto which said image sensor is mounted, wherein said outer end portion of said inclination adjusting plate comprises a proximate plate portion which is closer to said housing than said mounting plate portion, and wherein said pair of adjustment screws are screw-engaged with said proximate plate portion.

4. The imaging apparatus according to claim 3, wherein said ends of said threaded portions of said pair of adjustment screws are positioned closer to said housing than said mounting plate portion of said inclination adjusting plate.

5. The imaging apparatus according to claim 1, wherein said swing fulcrum comprises:

a fulcrum projection which is formed on said inclination adjusting plate substantially at a center of said inner end portion with respect to a lengthwise direction thereof, said fulcrum projection projecting in a direction away from said bending optical element; and a contact portion formed on said housing to contact said fulcrum projection.

6. The imaging apparatus according to claim 2, wherein said biaser comprises a pair of compression coil springs which are arranged to correspond to said pair of adjustment screws.

7. The imaging apparatus according to claim 1, wherein said bending optical element is provided between said image sensor and a lens group, of said imaging optical system, that is provided closest to the image side.

* * * * *